United States Patent [19]
Auerbach et al.

[11] 3,916,969
[45] Nov. 4, 1975

[54] METHOD OF BUILDING A RADIAL TIRE

[75] Inventors: Melvin Auerbach, Akron; Robert M. Pierson, Hudson, both of Ohio

[73] Assignee: The Goodyear Tire & Rubber Company, Akron, Ohio

[22] Filed: Oct. 26, 1973

[21] Appl. No.: 410,149

[52] U.S. Cl. ............... 152/354; 152/360; 152/374; 156/123; 156/128; 156/128 I; 156/133;
[51] Int. Cl.² .................. B29H 17/14; B60C 9/14; B60C 9/18; B29H/17/26
[58] Field of Search ......... 156/173, 128, 128 I, 123, 156/110 T, 133, 110; 260/880 B; 152/354, 360, 374

[56] References Cited
UNITED STATES PATENTS
3,525,654  8/1970  Uotani et al...................... 156/128 I OTHER PUBLICATIONS
Schildknecht, C. E., "Vinyl and Related Copolymers," John Wiley & Sons, N.Y. City, Copyright 1952, pp. 118, 119.

*Primary Examiner*—Clifton B. Cosby
*Attorney, Agent, or Firm*—F. W. Brunner; H. E. Hummer

[57] ABSTRACT

A flat-band method of building a radial tire wherein at least one carcass ply of rubberized tire cords are wrapped around a cylindrical tire building drum. The belt structure is placed annularly around the carcass ply and includes at least one layer of rubberized tire cords. A layer or film consisting essentially of a block polymer is interposed between the belt structure and carcass ply and acts as a lubricant between the two components to allow undistorted, reorientation of the reinforcement cords of the belt structure during the molding and vulcanization of the tire. This eliminates the need for toroidally shaping the tire to receive the belt structure.

24 Claims, 2 Drawing Figures

U.S. Patent    Nov. 4, 1975    3,916,969
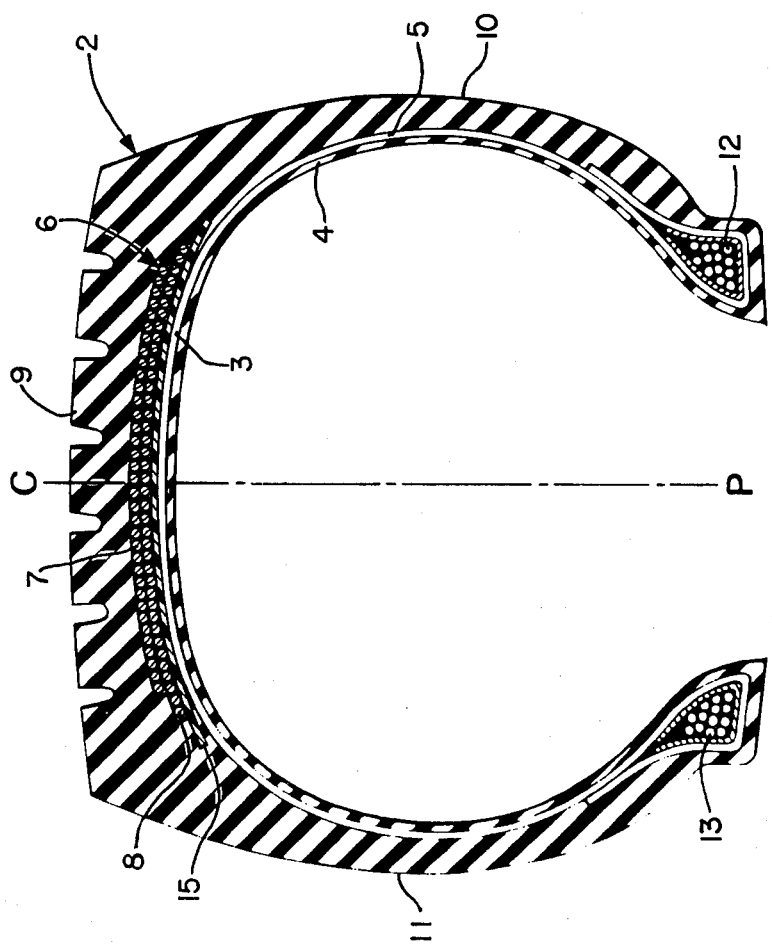
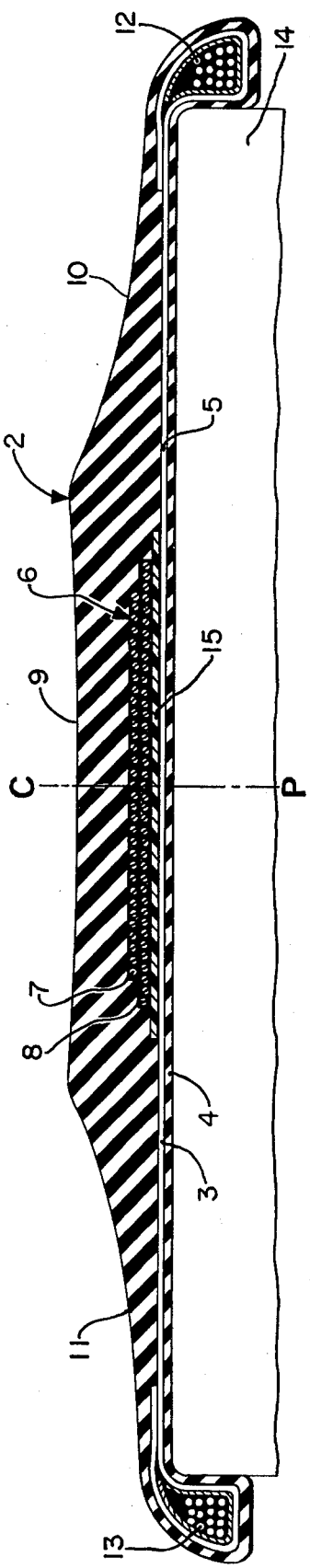

METHOD OF BUILDING A RADIAL TIRE

BACKGROUND OF THE INVENTION

The invention is particularly useful in building radial tires using the flat-band tire building method wherein the various components are wrapped on a cylindrical drum to form a generally cylindrical unvulcanized tire suitable for molding into a toroidal shape and curing. At present, many radial tires are constructed using what is referred to as a two-stage process. The carcass of the tire, consisting essentially of the innerliner, carcass plies and beads, is built on a cylindrical tire building drum during the first stage. The resulting cylindrical carcass is, during the second stage, toroidally shaped to receive the belt structure which is considered inextensible, being composed of rubberized reinforcement cords disposed at comparatively low cord angles, e.g. 16°–30° cord angle as compared to 75°–90° cord angle of the reinforcement cords of the carcass plies, such cord angles being measured at the midcircumferential centerline of the tread in relation to a plane CP containing the centerline, such plane hereinafter referred to as the centerplane. Any cord angle measurements mentioned here and in the claims are in relation to a molded and vulcanized tire which is uninflated. The second stage requires special equipment which increases the cost of radial tire production. It is desirable to use existing equipment now employed for building bias and bias-belted type tires. The invention is directed to an improved method for constructing radial tires on a conventional cylindrical tire building drum.

Briefly stated, the invention is in a method for building a radial tire and comprises wrapping at least one carcass ply of rubberized tire cords around a cylindrical tire building drum. A belt structure, including at least one layer of rubberized tire cords for annularly reinforcing the tire, is placed around the cylindrical carcass ply on the tire building drum. A thermoelastic block polymer film or layer is interposed between the belt structure and carcass ply. A pair of annular beads are secured to the carcass ply, and tread and sidewalls are wrapped around the carcass ply and belt structure to form a generally cylindrical uncured tire which is then removed from the building drum and toroidally shaped for vulcanization of the rubber material of the tire.

DESCRIPTION OF THE DRAWING

The following description of the invention will be better understood by having reference to the annexed drawing, wherein:

FIG. 1 is a cross-section of a tire made in accordance with the invention; and

FIG. 2 is a cross-section of the tire on a tire building drum.

ENVIRONMENT OF THE INVENTION

Referring to the drawing, there is shown a radial tire 2 having the essential components of: a tire carcass 3, including an air-impervious innerliner 4 and at least one carcass ply 5 comprised of rubberized reinforcement cords; a belt structure 6, including a pair of superimposed belts 7 and 8 comprised of rubberized reinforcement cords; and a tread 9 and pair of sidewalls 10 and 11 disposed on the outside of the tire carcass 3 and belt structure 6 and terminating at a pair of annular beads 12 and 13. The reinforcement cords of the carcass ply 5 and belts 7 and 8 are composed of any appropriate material, e.g. rayon, glass, or metal.

THE INVENTION

A layer or film 15 of material is disposed between the tire carcass 3 and belt structure 6 to cause slippage between the two components to facilitate reorientation, or pantographing, of the reinforcement cords of the belt structure 6 from a higher to a lower degree cord angle during molding of the tire from a cylinder to a toroid. This slippery effect of the film 15 disappears when the tire 2 is vulcanized such that the adhesion between the two components is not adversely affected. The block polymer film 15 produces beneficial results when placed between two adjacent layers of tire reinforcement cords having widely disparate cord angles where it is desirable to allow pantographing of the cords of one of the layers to a substantially smaller cord angle relative to the centerplane. A block polymer film 15 is normally not required between the belt structure 6 and a cordless tire tread 9, but may be effectively used between these two components of the tire when a tire tread 9 with reinforcement cords is used, especially in cases where the cord angles of the reinforcement cords of the two components are widely divergent. Thus, in some cases, the belt structure 6 may be sandwiched between two block polymer films 15 for allowing more effective pantographing of the reinforcement cords of the belt structure 6.

The film 15 is comprised of block polymers which contain three or more blocks and have thermoelastic properties. The block polymers are distinguished from normal random copolymers in that large numbers of monomer units, A, B, or C, are adjacent each other to form long chains having an ordered structure such as AAAAA . . . BBBBB . . . CCCCC or AAAAA . . . BBBBB . . . AAAAA. Block polymers are different from conventional polymers which are characterized by a random distribution of the monomer segments such as ABABABBABBAAB . . . and the like. The center blocks of the block polymers are rubbery while the end blocks are plastic-like in nature. Rubbery or plastic-like polymers are characterized by wide differences in glass transition temperatures and are well known to those skilled in the art.

The block polymers of this invention are usually prepared in a conventional solution polymerization system using as a catalyst organo-lithium compounds or organo-dilithium compounds. Those skilled in the art of preparing block polymers of the type useful in this invention should be able to determine the type of catalyst required. Some representative examples are: dilithiomethane, 1,4-dilithiobutadiene, dilithionaphthalene, dilithioisoprene, lithium amyl, lithium butyl, lithium ethyl, and the like.

The processes of preparing such polymers are well known in the art and will not be further described here except to say that the amount of catalyst employed as a general rule is determined by the molecular weight of the polymer. In general, the molecular weight of the polymer is approximately equal to the grams of polymer formed divided by the moles of initiator employed.

The vinyl substituted aromatic compounds designated as A in the ABA block polymer should be at least 15 to 60 percent by weight of the total polymer and preferably from 25 to 50 percent by weight of the total weight of the polymer. The A segments should, if possible, be equally divided on each end of the block and should not vary from this standard by more than 10–20 percent, because the slippery characteristic of the film 5 becomes adversely affected as the distribution of the A segments varies appreciably from the aforementioned 50–50 balanced distribution.

The combined weight of the A and C segments of the ABC blocks should be from 15 to 60 percent by weight of the ABC block, the weight of the C segment being at least one percent of the total weight of the block, and the weight of the A segment being at least 15 percent of the weight of the block and preferably in the range of from 15 to 25 percent.

Examples of the monomers employed to form the ABA or ABC block polymers in this invention are vinyl substituted aromatic compounds as A, conjugated diolefins as B, and polar monomers as C.

The molecular weight of the ABA and ABC block polymers useful in this invention should range from about 50,000 to about 150,000 with from about 60,000 to about 100,000 being more preferred.

Representative examples of the monomers forming the A segment of such block polymers are:

A Segment

The vinyl-substituted aromatic compounds include styrene, 1-vinylnaphthalene, 2-vinylnaphthalene, and alkyl, cycloalkyl, aryl, alkaryl, aralkyl, alkoxy, aryloxy, and dialkylamino derivatives thereof in which the total number of carbon atoms in the combined substituents is generally not greater than 12. Examples of these aromatic monomers include 3-methylstyrene (3-vinyltoluene), 3,5-diethylstyrene, 4-n-propylstyrene, 2,4,6-trimethylstyrene, 4-dodecylstyrene, 3-methyl-5-n-hexylstyrene, 4-cyclohexylstyrene, 4-phenylstyrene, 2-ethyl-4-benzylstyrene, 4-p-tolylstyrene, 3,5-diphenylstyrene, 2,4,6-tri-tert-butylstyrene, 2,3,4,5-tetramethylstyrene, 4-(4-phenyl-n-butyl)styrene, 3-(4-n-hexylphenyl)-styrene, 4-methoxystyrene, 3,5-diphenoxystyrene, 3-decoxystyrene, 2,6-dimethyl-4-hexoxystyrene, 4-dimethylaminostyrene, 3,5-diethylaminostyrene, 4-methoxy-6-di-n-propylaminostyrene, 4,5-dimethyl-l-vinylnaphthalene, 3-ethyl-1-vinylnaphthalene, 6-isopropyl-1-vinylnaphthalene, 2,4-diisopropyl-1-vinylnaphthalene, 3,6-di-p-tolyl-l-vinylnaphthalene, 6-cyclohexyl-1-vinylnaphthalene, 4,5-diethyl-8-octyl-1-vinylnaphthalene, 3,4,5,6-tetramethyl-1-vinylnaphthalene, 3,6-di-n-hexyl-1-vinylnaphthalene, 8-phenyl-1-vinylnaphthalene, 5-(2,4,6-trimethylphenyl)-1-vinylnaphthalene, 3,6-diethyl-2-vinylnaphthalene, 7-dodecyl-2-vinylnaphthalene, 4-n-propyl-5-n-butyl-2vinylnaphthalene, 6-benzyl-2-vinylnaphthalene, 3-methyl-5,6-diethyl-8-n-propyl-2-vinylnaphthalene, 4-o-tolyl-2-vinylnaphthalene, 5-(3-phenyl-n-propyl)-2-vinylnaphthalene, 4-methoxy-1-vinylnaphthalene, 6-phenoxyl-1-vinylnaphthalene, 3,6-dimethylamino-1-vinylnaphthalene, 7-dihexoxy-2-vinylnaphthalene, and the like.

Representative examples of the monomers forming the B segment of such block polymers are:

B Segment

Examples of these compounds include the following: 1,3-butadiene, isoprene, 2,3-dimethyl-1,3-butadiene, 1,3-pentadiene (piperylene), 2-methyl-3-ethyl-1,3-butadiene, 3-methyl-1,3-pentadiene, 2,methyl-3-ethyl-1,3-pentadiene, 2-ethyl-1,3-pentadiene, 1,3-hexadiene, 2-methyl-1,3-hexadiene, 1,3-heptadiene, 3-methyl-1,3-heptadiene, 1,3-octadiene, 3-butyl-1,3-octadiene, 3,4-dimethyl-1,3-hexadiene, 3-n-propyl-1,3-pentadiene, 4,5-diethyl-1,3-octadiene, phenyl-1,3-butadiene, 2,3-diethyl-1,3 butadiene, 2,3-di-n-propyl-1,3-butadiene, 2-methyl-3-isopropyl-1,3-butadiene, and the like. Conjugated dienes containing alkoxy substituents along the chain can also be employed, such as 2-methoxy-1,3-butadiene, 2-ethoxy-3-ethyl-1,3-butadiene, and 2-ethoxy-3-methyl-1,3-hexadiene.

Representative examples of the monomers forming the C segment of such block polymers are:

C Segment

These polar monomers include vinylpyridines and vinylquinolines such as 2-vinylpyridine, 4-vinylpyridine, 3,5-diethyl-4-vinylpyridine, 5-methyl-2-vinylpyridine, 5-n-octyl-2-vinylpyridine, 3-n-dodecyl-2-vinylpyridine, 3,5-di-n-hexyl-4-vinylpyridine, 5-cyclohexyl-2-vinylpyridine, 4-phenyl-2-vinylpyridine, 3,5-di-tert-butyl-2-vinylpyridine, 3-benzyl-4-vinylpyridine, 6-methoxy-2-vinylpyridine, 4-phenoxy-2-vinylpyridine, 4-dimethylamino-2-vinylpyridine, 3,5,dimethyl-4-diamylamino-2-vinylpyridine, 2-vinylquinoline, 4-vinylquinoline, 2-tert-butyl-4-vinylquinoline, 3-methyl-4-vinylquinoline, 3-cyclohexyl-4-vinylquinoline, 3-methyl-4-ethoxy-2-vinylquinoline, 1-vinylisoquinoline, 3-vinylisoquinoline, 4-tert-dodecyl-1-vinylisoquinoline, 3-dimethylamino-3-vinylisoquinoline, 4-benzyl-3-vinylisoquinoline, 4-phenyl-1-vinylisoquinoline, and the like.

Other polar monomers include acrylic and alkacrylic acid esters, nitriles, and N,N-disubstituted amides, such as methyl acrylate, ethyl acrylate, butyl acrylate, methyl methacrylate, ethyl metacrylate, propyl methacrylate, butyl methacrylate, methyl ethacrylate, ethyl ethacrylate, isopropyl ethacrylate, acrylonitrile, methacrylonitrile, N,N-dimethylacrylamide, N,N-diethylmethacrylamide, and the like. Vinylfuran and N-vinylcarbazole can also be used.

The film 15 has a thickness of approximately 1–2 mils and is preferably cast from a tetrahydrofuran solution containing a block polymer. Carbon black and other well-known ingredients are dispersed in the solution when a black-loaded productive film is desired. A productive film is defined as one to which all pigments, curatives, and other compounding ingredients have been added, and it needs only the heating step to convert it to the vulcanized form. Films 15 cast from styrene-butadienestyrene SBS-31% styrene) and styrene-butadiene-vinylpyridine (SBVP-20% styrene and 16% vinylpyridine) block copolymers, both without and loaded with carbon black, have been used with success as a lubricant between the carcass ply 5 and nearest belt ply 8 for causing slippage between the two plies to facilitate a change in the cord angles of the belt cords.

The radial tire 2 is produced on a conventional cylindrical tire building drum 14 (FIG. 2) by successively wrapping the innerliner 4, and at least one carcass ply 5 of rubberized reinforcement cords cylindrically around the drum 14. The annular beads 12 and 13 are secured to the tire carcass 3 by wrapping opposing ends of innerliner 4 and carcass ply 5 around the beads 12 and 13 after the beads are positioned inwardly of the opposing ends. A film 15 of block polymer, as previously described, is then placed around the carcass ply 5, prior to positioning the belt structure 6 on the tire carcass 13. The tread 9 and sidewalls 10 and 11, normally a composite piece of different extruded materials, is then wrapped around the carcass ply 5 and belt structure 6 between the beads 12 and 13 to form a generally cylindrical unvulcanized rubber tire. The unvulcanized tire is next removed from the cylindrical tire building drum 14 and molded into a toroidal shape and vulcanized in conventional equipment presently employed in the molding and vulcanization of tires. The cord angle of the reinforcement cords of the belt structure 6 changes during the molding operation to a lower more desirable cord angle, e.g. from 50°–52° to 24° measured from the centerplane.

Thus, there has been described a highly improved metod of building a radial tire using the flat-band tire building method. The block polymer film allows the reinforcement cords of the belt structure to change their angular orientation a greater number of degrees than when the layer or film is not used. The reinforcement cords of the belt structure of a radial tire built in accordance with the aforementioned process, are disposed at angles in the range of from 20° to 30° measured from the centerplane.

What is claimed is:

1. A method of building a tire of two adjacent layers of rubberized tire cords wherein during molding of the tire it is important that the cord angle of the cords of at least one of the layers change, characterized by placing a third layer of material between the two layers prior to molding the tire into a toroidal configuration for vulcanization, the material comprising a thermoelastic block polymer from the group of ABA and ABC block polymers in which A represents a polymer derived from monovinyl aromatic monomers, C represents a polar polymer derived from vinyl pyridine, vinyl quinoline, acrylic, vinyl nitrile, vinyl furan and vinyl carbazole monomers, B represents a rubbery polymer derived from a conjugated diolefin monomer, and in which A represents from 15 to 60 percent by weight of the total ABA polymer, and in which A plus C represents 15 to 60 percent by weight of the total ABC polymer, and in which the molecular weights of the ABA and ABC block polymers are each in the range of from 50,000 to 150,000.

2. The method of claim 1, wherein the block polymer is of the group of ABA block polymers.

3. The method of claim 2, wherein the ABA block polymer is a styrene-butadiene-styrene (SBS) block polymer.

4. The method of claim 1, wherein the block polymer is of the group of ABC block polymers.

5. The method of claim 4, wherein the ABC block polymer is a styrene-butadiene-vinylpyridine (SBVP)) block polymer.

6. The method of claim 1, wherein the material includes carbon black.

7. A method of building a radial tire, comprising:
a. wrapping at least one carcass ply of rubberized tire cords around a cylindrical tire building drum;
b. securing a pair of annular beads to the carcass ply;
c. placing a belt structure around the cylindrical carcass ply on the tire building drum, the belt structure including at least one layer of rubberized tire cords for annularly reinforcing the tire;
d. interposing between the belt structure and carcass ply, a layer of material comprising a thermoelastic block polymer from the group of ABA and ABC block polymers in which A represents a polymer derived from monovinyl aromatic monomers, C represents a polar polymer derived from vinyl pyridine, vinyl quinoline, acrylic, vinyl nitrile, vinyl furan and vinyl carbazole monomers, B represents a rubbery polymer derived from a conjugated diolefin monomer, and in which A represents from 15 to 60 percent by weight of the total ABA polymer, and in which A plus C represents 15 to 60 percent by weight of the total ABC polymer, and in which the molecular weights of the ABA and ABC block polymers are each in the range of from 50,000 to 150,000;
e. placing tread and sidewalls around the cylindrically shaped carcass ply, block polymer, and belt structure to form a generally cylindrically shaped unvulcanized tire;
f. removing the cylindrically shaped unvulcanized tire from the tire building drum;
g. molding the cylindrically shaped unvulcanized tire into a toroidal configuration; and
h. heating the toroidally shaped unvulcanized tire to vulcanize the rubber material of the tire.

8. The method of claim 7, wherein the block polymer is of the group of ABA block polymers.

9. The method of claim 8, wherein the ABA block polymer is a styrene-butadiene-styrene (SBS) block polymer.

10. The method of claim 7, wherein the block polymer is of the group of ABC block polymers.

11. The method of claim 14, wherein the ABC block polymer is a styrene-butadiene-vinylpyridine (SBVP) block polymer.

12. The method of claim 7, wherein the material includes carbon black.

13. The method of claim 7, wherein the cord angle of the reinforcement cords of the belt structure is in the range of from 20°–30° measured in relation to the centerplane of the molded and vulcanized tire when the tire is uninflated.

14. A radial tire comprising:
a. at least one carcass ply of rubberized reinforcement cords disposed at angles in the range of from 75° to 90° measured in relation to the centerplane of the tire when the tire is uninflated;
b. an annular belt structure superimposed on the carcass ply for annularly reinforcing the tire, the belt structure including at least one layer of rubberized reinforcement cords which are disposed at correspondingly measured cord angles of not more than 30°; and
c. a layer of material interposed between the carcass ply and belt structure, the material comprising a thermoelastic block polymer from the group of ABA and ABC block polymers in which A represents a polymer derived from monovinyl aromatic monomers, C represents a polar polymer derived from vinyl pyridine, vinyl quinoline, acrylic, vinyl nitrile, vinyl furan and vinyl carbazole monomers, B represents a rubbery polymer derived from a conjugated diolefin monomer, and in which A represents from 15 to 60 percent by weight of the total ABA polymer, and in which A plus C represents 15 to 60 percent by weight of the total ABC polymer, and in which the molecular weights of the ABA and ABC block polymers are each in the range of from 50,000 to 150,000.

15. The radial tire of claim 14, wherein the block polymer is of the group of ABA block polymers.

16. The radial tire of claim 15, wherein the ABA block polymer is a styrene-butadiene-styrene (SBS) block polymer.

17. The radial tire of claim 14, wherein the block polymer is of the group of ABC block polymers.

18. The radial tire of claim 17, wherein the ABC block polymer is a styrene-butadiene-vinylpyridine (SBVP) block polymer.

19. The radial tire of claim 14, wherein the material includes carbon black.

20. A method of building a radial tire comprising:
   a. forming a cylindrically shaped carcass comprised of uncured elastomeric material, the carcass including a belt structure spaced from at least one carcass ply;
   b. interposing between the belt structure and the at least one carcass ply, a layer of material comprising a thermoelastic block polymer from the group of ABA and ABC block polymers in which A represents polymer plymer derived from monovinyl aromatic monomers, C represents a polar polymer derived from vinyl pyridine, vinyl quinoline, acrylic, vinyl nitrile, vinyl furan and vinyl carbazole monomers, B represents a rubbery polymer derived from a conjugated diolefin monomer, and in which A represents from 15 to 60 percent by weight of the total ABA polymer, and in which A plus C represents 15 to 60 percent by weight of the total ABC polymer, and in which the molecular weights of the ABA and ABC block polymers are each in the range of from 50,000 to 150,000;
   c. toroidally shaping the uncured carcass including the block polymer material; and
   d. curing the elastomeric material to form a toroidally shaped radial tire.

21. The method of claim 20, wherein the reinforcement cords of the belt structure and the at least one carcass ply are disposed at angles in the ranges of from 20°–30° and 75°–90° respectively, measured from the centerplane.

22. The method of claim 20, wherein the ABA block polymer is a styrene-butadiene-styrene (SBS) block polymer.

23. The method of claim 20, wherein the ABC block polymer is a styrene-butadiene-vinylpyridine (SBVP) block polymer.

24. The method of claim 20, wherein the block polymer includes carbon black.

* * * * *